United States Patent
Corcoran

(10) Patent No.: US 6,286,806 B1
(45) Date of Patent: Sep. 11, 2001

(54) ADJUSTABLE SENSOR SUPPORTING APPARATUS AND METHOD

(76) Inventor: Dan E. Corcoran, 8385 SW. Gearhart Dr., Beaverton, OR (US) 97007

( * ) Notice: Subject to any disclaimer, the term of this patent is extended or adjusted under 35 U.S.C. 154(b) by 0 days.

(21) Appl. No.: 09/488,912

(22) Filed: Jan. 20, 2000

(51) Int. Cl.$^7$ .................................. F16M 1/00
(52) U.S. Cl. .......................... 248/678; 248/519
(58) Field of Search ................... 248/678, 676, 248/519, 181.1, 181.2, 183.1, 187.1, 186.2, 188, 188.8, 371, 397, 125.1, 125.8, 514, 178.1

(56) References Cited

U.S. PATENT DOCUMENTS

| | | | |
|---|---|---|---|
| 916,286 | * 3/1909 | Evans | 248/183.1 |
| 1,764,721 | * 6/1930 | Hayden | 248/183.1 |
| 3,000,041 | * 9/1961 | Reynolds | 16/42 |
| 3,638,502 | 2/1972 | Levitt et al. | 74/5.34 |
| 3,752,376 | 8/1973 | Shelton et al. | 224/42.45 B |
| 4,029,246 | 6/1977 | Woodruff | 224/42.45 B |
| 4,531,699 | 7/1985 | Pinson | 248/550 |
| 4,571,758 | * 2/1986 | Samuelsson | 5/86 |
| 4,621,786 | 11/1986 | Greenlee | 354/74 |
| 4,685,649 | 8/1987 | McKay | 248/594 |
| 4,989,823 | * 2/1991 | Chapman | 248/638 |
| 5,280,871 | * 1/1994 | Chuang | 248/516 |
| 5,402,595 | * 4/1995 | Tamllos | 42/94 |
| 5,466,078 | * 11/1995 | Szmanda et al. | 400/489 |
| 5,551,655 | * 9/1996 | Berger | 248/168 |
| 5,725,187 | * 3/1998 | Vo | 248/178.1 |
| 5,769,369 | 6/1998 | Meinel | 248/176.1 |
| 5,794,899 | * 8/1998 | Tamllos | 248/166 |
| 5,871,186 | 2/1999 | Bothe et al. | 248/181.1 |
| 5,876,005 | 3/1999 | Vasconi | 248/276.1 |
| 6,149,112 | * 11/2000 | Thieltges | 248/178.1 |

* cited by examiner

Primary Examiner—Ramon O. Ramirez
Assistant Examiner—A. Joseph Wujciak
(74) Attorney, Agent, or Firm—Chernoff, Vilhauer, McClung & Stenzel, LLP

(57) ABSTRACT

An adjustable mounting apparatus for carrying a camera or other sensor in a small helicopter or other moving platform and isolating the camera from vibration without modification of the aircraft or other platform, and a method for using a sensor such as a camera in a small aircraft or other moving platform operated by a single person. A base portion of the apparatus is carried on a cushioned seat, and a universally adjustable mast is carried on the base in a selected position with respect to the platform and isolated from the base by an elastomeric cushion to eliminate vibration. A camera or other sensor is carried on a servo-controlled attachment fixture fastened to the top of the mast, and a video monitor is located in view of the aircraft operator. Servo-controls for adjusting and operating the camera or other sensor are located in reach of the aircraft operator. A cart is used for storage and to support the mast during installation or removal of the base.

44 Claims, 7 Drawing Sheets

ADJUSTABLE SENSOR SUPPORTING APPARATUS AND METHOD

BACKGROUND OF THE INVENTION

The present invention relates to an adjustable sensor supporting and mounting apparatus for carrying a sensor such as a video camera or infra-red sensing device in an aircraft or other moving platform, reducing or eliminating vibration of the platform as experienced by the sensor, and which allows the direction of the camera or other sensor to be controlled by the operator of the helicopter or other moving platform.

In certain situations, including firefighting, rescue, wildlife observation and trailing, and law enforcement operations it is desired to have quickly available airborne cameras and video transmitting equipment. This has previously required costly use of fairly large helicopters, for example. News gathering organizations wanting to obtain on-the-spot images of newsworthy events similarly have had to have both an aircraft pilot and a camera operator quickly available, with a helicopter large enough to carry two people plus the required camera equipment or other sensors and transmitting equipment. This requirement has limited the utility of smaller, less-expensive helicopters and non-dedicated, or multipurpose, helicopters and fixed wing aircraft as news-gathering vehicles and for the other sensor uses mentioned above. It has also required the availability of a cameraman in addition to a helicopter pilot, thus requiring the arrival of two people before departure of the aircraft toward the location of an event in progress.

Because of the need in the past for an aircraft with the ability to carry the weight of a camera operator or special camera mounting and stabilizing equipment it has been necessary for on-scene airborne photographers to use larger aircraft, with operating costs of several times the cost of operating popular small two-passenger helicopters.

Camera operators attempting to obtain video images or photographs of events taking place without externally mounted equipment are usually required to view the events through the side windows or doorway openings of aircraft, particularly helicopters, in order to obtain an unobstructed view, particularly for infrared cameras and sensors. The side door has the advantage of giving an unobstructed view to the side, allowing the aircraft to circle or hover keeping a target in view, but it may also be desired to use video equipment or cameras to photograph objects straight ahead or in other positions as well. Use of a hand-held camera inside a small aircraft for such views is often impractical because of limited cabin size. Also, use of hand-held video cameras may subject camera operators to motion sickness, even though the normal location of a passenger's seat in a small aircraft often provides an ideal viewpoint.

The additional weight of gyro stabilizing equipment for motion picture or video cameras may make use of such stabilizing equipment impractical in very small aircraft. Special mounts for carrying remotely controllable cameras externally of an aircraft's cabin are extremely expensive and may also be too heavy for use on small helicopters or other light aircraft. Such equipment, when installed, may also impair the availability of an aircraft for other desirable uses, such as for pilot training. Additionally, such devices may require approval of governmental agencies before they can be permanently mounted on any particular model of aircraft.

Vibration of a helicopter because of its rotors, or vibration of other aircraft or motor vehicles because of their engines or surfaces being traveled on, can be a problem in obtaining useful camera images. While gyroscopic image stabilization devices are available for some cameras, such devices are expensive and may not be capable of dealing with all of the vibration associated with operation of helicopter or other moving platform on which a camera or other sensor is carried.

Attention to some of the foregoing needs and problems has been noted in prior patents including Greenlee U.S. Pat. No. 4,621,786, McKay U.S. Pat. No. 4,685,649, Vasconi U.S. Pat. No. 5,876,005, Bothe, et al., U.S. Pat. No. 5,871,186, Meinel U.S. Pat. No. 5,769,369, Pinson U.S. Pat. No. 4,531,699, Leavitt U.S. Pat. No. 3,638,502, and U.K. Patent Application No. GB 2 161 668A, but those teachings have not provided entirely satisfactory solutions.

What is desired, then, is an improved apparatus and a method for its use for carrying a sensor such as a camera in a helicopter or automobile, or on another moving platform, and for enabling the camera or other sensor to be operated by the helicopter pilot or operator of such other vehicle. Such apparatus should be easily and quickly installed on or removed from a non-dedicated vehicle and easily adjusted to a desired or preferred position and orientation with respect to the helicopter or other platform. The apparatus should substantially isolate the camera or other sensor from vibrations of the helicopter or other platforms, without being unnecessarily complex.

Preferably, such a sensor supporting apparatus should be easily constructed and of modest cost and should not require structural modification of the helicopter or other platform in connection with its installation therein.

SUMMARY OF THE INVENTION

The present invention provides an answer to the aforementioned need for an improved way for an unaccompanied pilot or vehicle operator to safely operate one or more cameras in a mobile platform such as a small helicopter having a limited load carrying capacity, by providing a stable, vibration-limiting, and adjustable sensor-carrying apparatus.

Apparatus according to a preferred embodiment of the present invention includes a base having a first spherical mating surface. The base supports a mast including a second spherical mating surface, making the position of the mast thereby adjustable to a desired orientation with respect to the base. The apparatus also includes an elastomeric cushioning body located between the base and the mast, to isolate a camera or other sensor carried on the mast from undesirable vibration of a platform in or on which the apparatus is to be used.

According to one preferred embodiment of the apparatus according to the present invention the base defines a concave spherical mating surface and the elastomeric cushioning body is carried on the lower portion of the mast and defines a convex spherical mating surface.

The method of the present invention includes placing the base and adjusting the mast with respect to the base to a desired orientation, which may be established as a preset or initial position of the convex mating surface with respect to the concave mating surface, and then holding the mast in that orientation with respect to the base while cushioning the mast to isolate it from vibration imposed on the base by the helicopter or other platform. In one preferred orientation the mast is vertical during straight and level travel, and an attachment fixture attached to the mast allows a camera or other sensor carried thereon to be moved through an angle in a first plane about an axis that may be parallel with the mast, and also allows movement through an angle about an axis parallel with the first plane.

In a preferred embodiment the sensor supporting apparatus supports a sensor at a location within the aircraft where the camera lens or other sensor is located in a position comparable to that of the eyes of a person seated in the aircraft.

One embodiment of the method includes supporting the base on a cushioned passenger seat and by legs including cushioned feet, and also includes holding the mast in the desired orientation by adjusting flexible elongate tension-bearing members such as nylon straps, extending in separate directions between the mast and a part of the helicopter or other platform.

According to another aspect of the method of the present invention an image perceived by the camera or other sensor is disclosed in a location where it is available to a pilot of the helicopter or to the operator of another type of sensor-carrying platform.

According to a further aspect of the invention a carrying cart is provided to carry the base and also to support the mast separately with its mating surface on a mating surface of a carrier provided on the cart, so the sensor supporting apparatus can easily be installed in or removed from a helicopter or other mobile sensor-carrying platform.

It is a feature of the present invention that it provides an easily installed and functional, adjustable, sensor supporting device that does not require structural modification of an aircraft in which it is installed.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
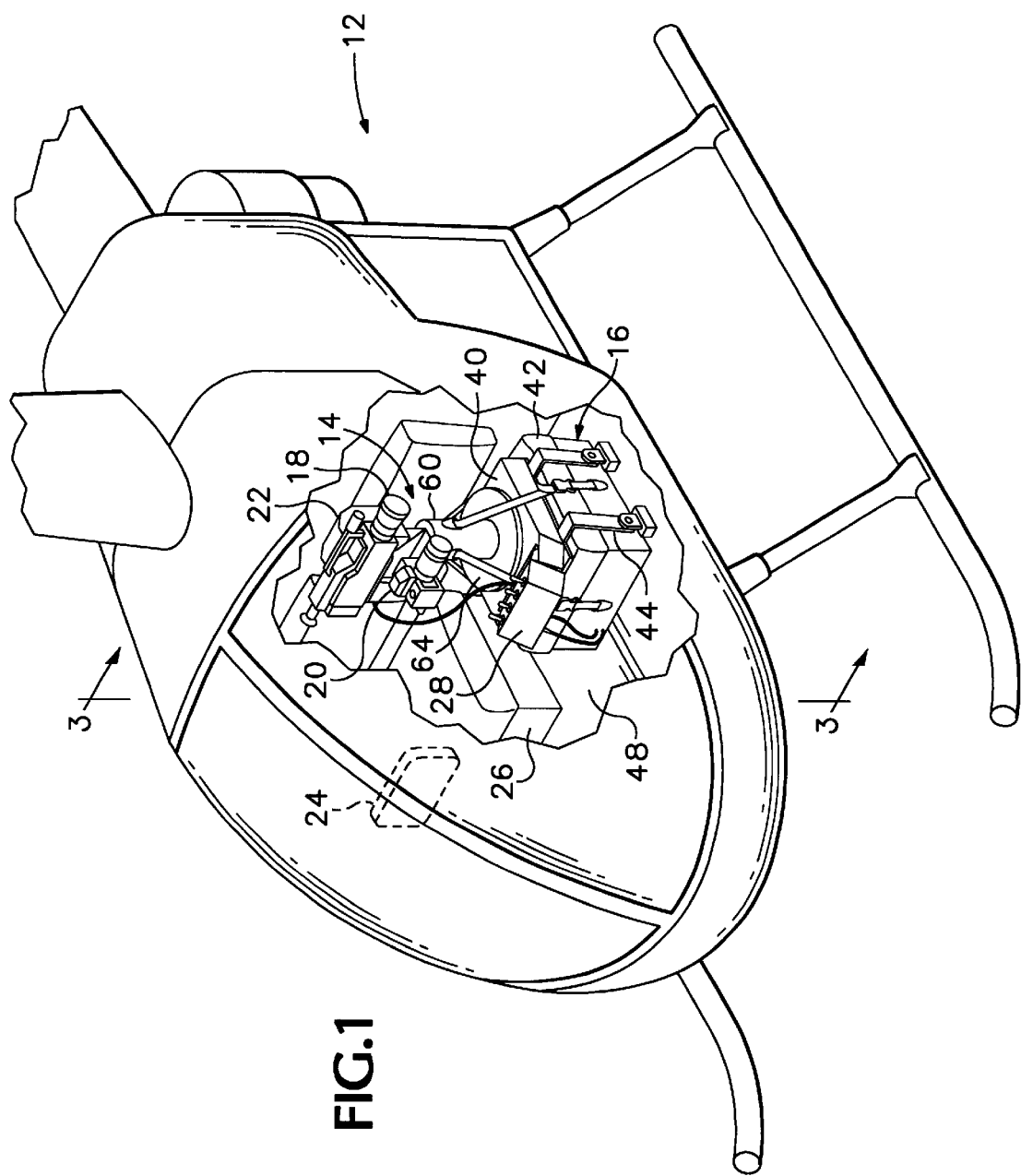
FIG. 1 is a partially cutaway perspective view of a small helicopter equipped with a video camera and a still camera supported by the adjustable sensor supporting apparatus of the present invention, carried in a passenger seat the helicopter.

Referring now to the drawings which form a part of the disclosure herein, in FIG. 1 a small two passenger helicopter 12 is shown equipped with an adjustable sensor supporting apparatus 14 embodying the present invention mounted on a passenger seat 16. The supporting apparatus 14 supports a video camera 18 and a still camera 20 both mounted on a motor-driven servo-controlled carrier 22 by which the cameras can be pointed in a desired position relative to the helicopter 12. A video monitor 24 provided with a signal from the video camera 18 is mounted inside the cabin of the helicopter 12 in a position from which it is visible easily to the pilot during in-flight use of the video camera 18.

Figure 2:
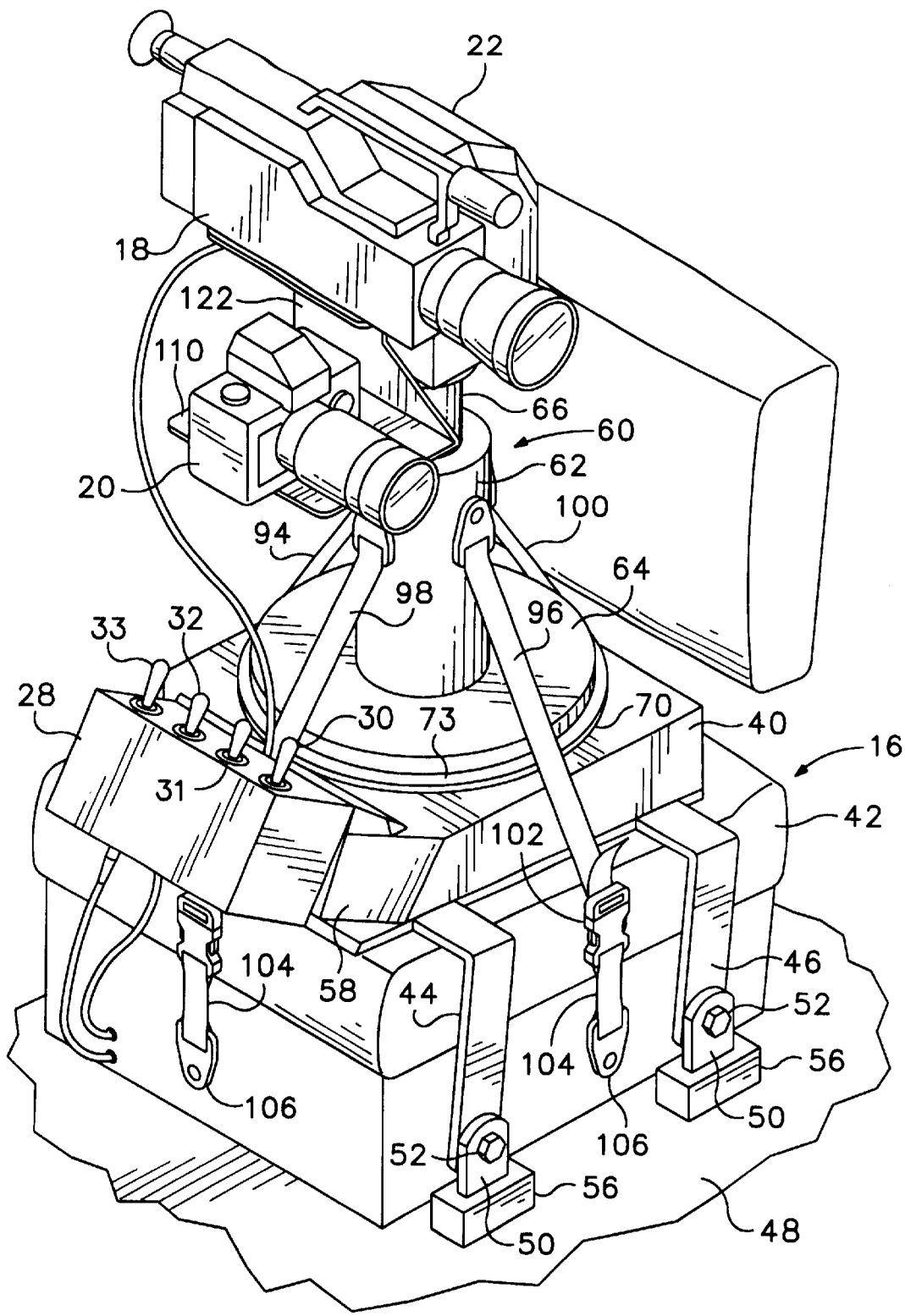
FIG. 2 is a perspective view, at an enlarged scale, of the passenger seat of the helicopter shown in FIG. 1, together with he adjustable sensor supporting apparatus and came shown in FIG. 1.
Figure 3:
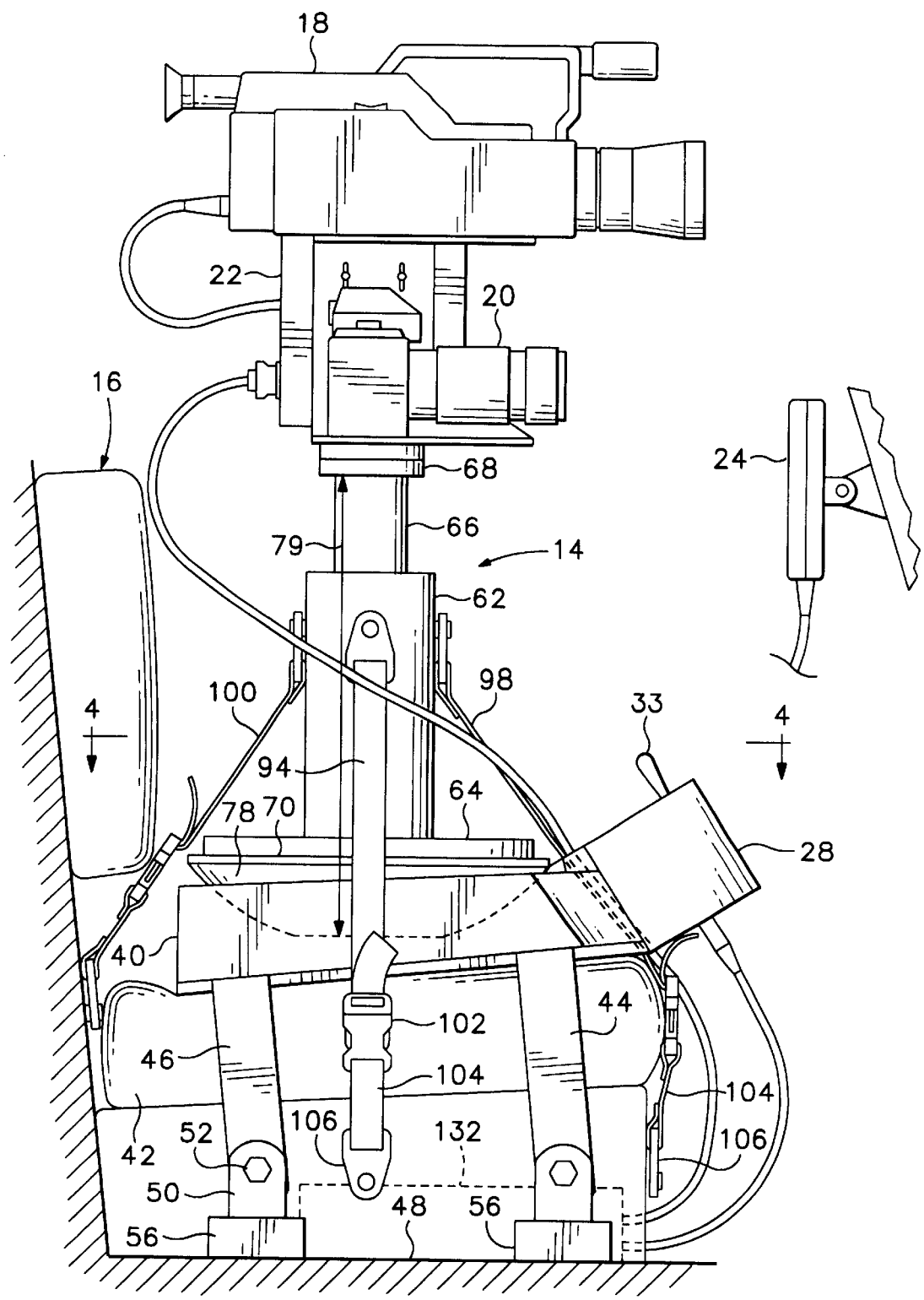
FIG. 3 is a side elevational view of a portion of the helicopter, together with the adjustable sensor supporting apparatus d cameras shown in FIGS. 1 and 2, taken in the dire ion indicated by line 3—3 in FIG. 1.
Figure 4:
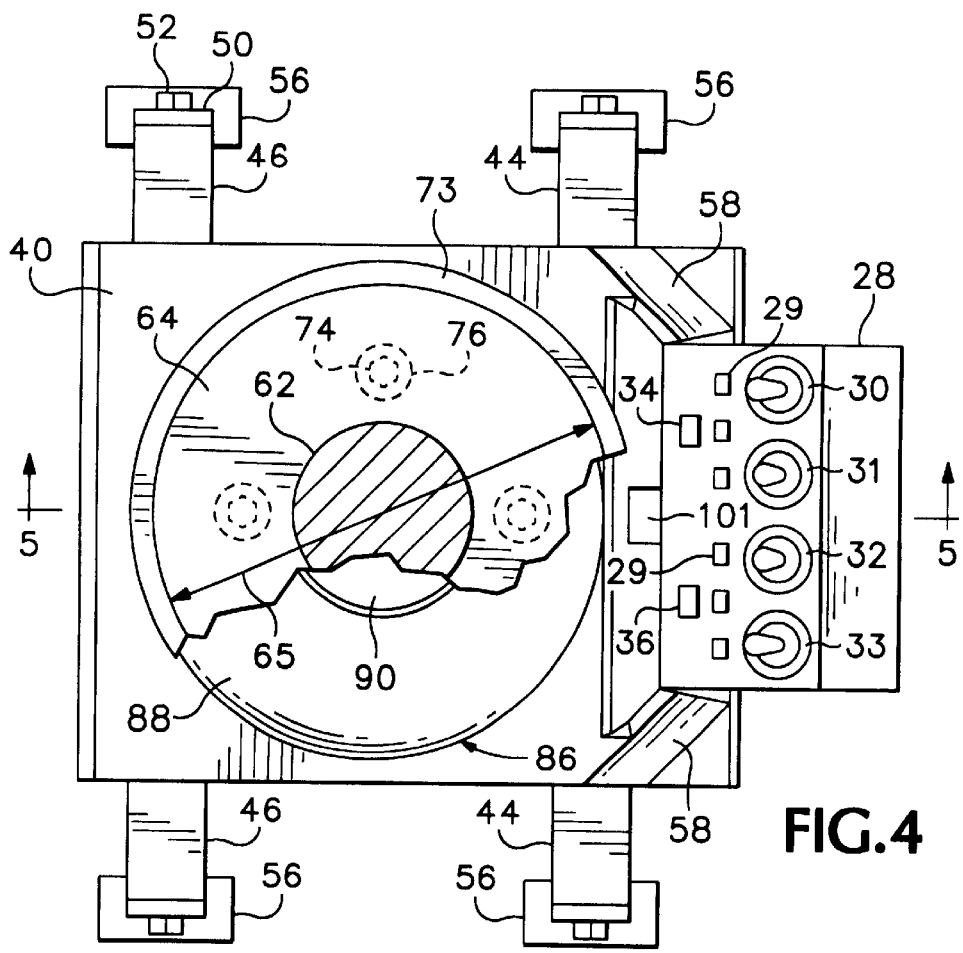
FIG. 4 is a top plan view of the base and a portion of the mast of the adjustable sensor supporting apparatus shown in FIG. 3, taken along line 4—4 of FIG. 3.

Referring now also to FIGS. 2 and 3, as the pilot sits normally in the right hand seat 26 in a currently popular helicopter, the adjustable sensor supporting apparatus 14, the video camera 18 and still camera 20, located in the passenger seat 16, affords a view outward through the left hand side window, or doorway, or portion of a transparent canopy bubble, according to the structure of the particular helicopter, when the cameras are pointed as shown in FIGS. 1 and 2. The cameras 18 and 20 may instead be aimed forward of the aircraft as shown in FIG. 3.

The camera carrier 22 may be controlled by the pilot by the use of a servo-control system. A control panel 28 including joysticks 30, 31, 32, and 33 is therefore connected to perform various sensor control functions. For example, the joystick 30 may be used to zoom or change the effective focal length of the lens of the video camera 18 between various wide angle and telephoto settings. Joystick 31 may be used to control the speed of zooming. Joystick 32 may be used to control the speed of changing directional aim, and joystick 33 may be used to control the direction (pan and tilt) of the camera's aim. Controls may be provided similarly to operate the still camera 20.

Several preset combinations of zoom (focal length) pan (azimuth) and tilt (elevation) are preferably programmed to be available to be selected individually by use of one or more control buttons 29 which may be provided on the control panel 28. An additional combination of sensor and carrier settings may be accepted and memorized by the servo-control system with the camera carrier in a desired position by using an appropriate control such as a "set" button 34, and that sensor position and condition can later be resumed by using an appropriate control such as a "recall" button 36.

Alternatively, or additionally, similarly capable control switches for the servo system may be mounted on a cyclic control handle or flight control yoke (not shown) of the aircraft, with necessary wires attached securely but simply and removably by self-locking plastic wiring harness straps. In such a location, force control joysticks or similar thumb-tilt devices are preferably used instead of the joysticks 30, 31, 32, and 33. The functions of the speed control joysticks 31 and 32 may be included in a respective joystick or thumb pressure control switch, if desired, in such a control arrangement. Such control devices are available, for example, from Measurement Systems, Inc., of Fairfield, Conn. as Models 465, 467, 469, and 470 series miniature joysticks and thumb operated joysticks.

The adjustable sensor supporting apparatus 14 includes a base 40 that rests on the passenger seat 16 of the helicopter 12 as shown herein, supported by the cushion 42 on which a passenger would normally sit. A pair of front legs 44 and a pair of rear legs 46 are made of flat metal bars shaped generally as inverted "U"'s and extend beneath the base 40 and thence downward toward the surface of the deck or floor 48 of the cabin of the helicopter 12 on opposite sides of the passenger seat 16. The pairs of legs 44 and 46 are simply attached in shallow recesses provided in the bottom of the base 40, as by bolts (not shown), and may be made in various easily interchangeable lengths and widths to fit various aircraft.

Figure 5:
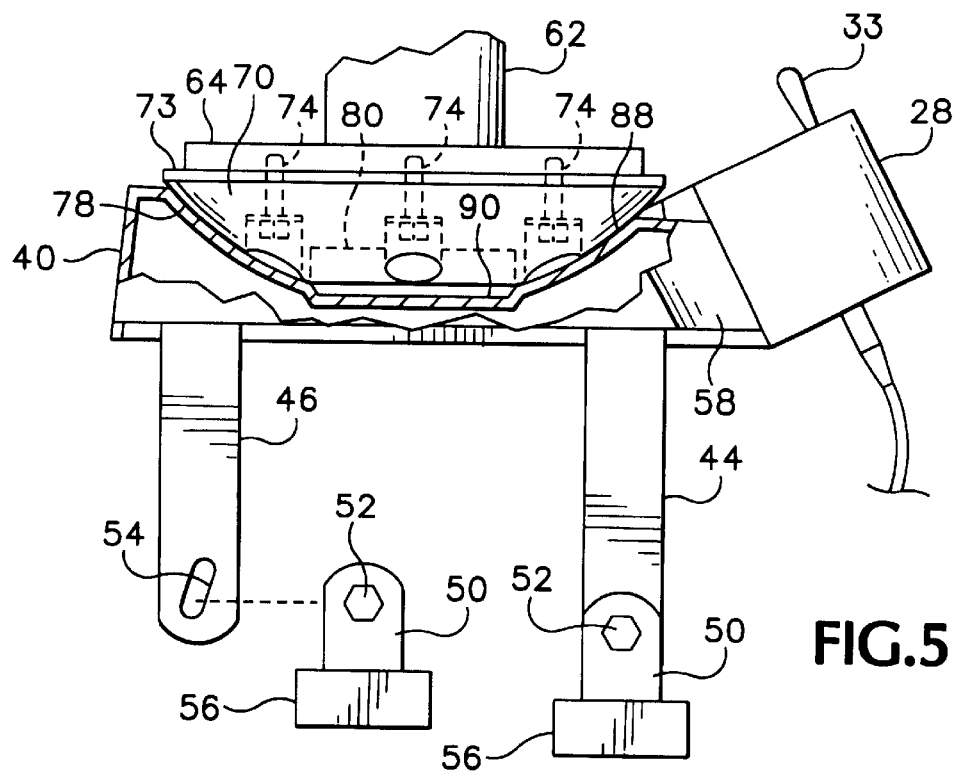
FIG. 5 is a partially cutaway, partially exploded view of the portions of the adjustable sensor supporting apparatus shown in FIG. 4, taken in the direction indicated by the line 5—5 in FIG. 4.

A foot 50 is attached to each of the legs 44 and 46 by an appropriate fastener such as a bolt and nut combination 52 which can be tightened appropriately in a required position in a respective slot 54, provided in each leg 44 or 46, as shown in FIG. 5, to fasten each foot 50 securely to the respective one of the legs 44 and 46. Each foot 50 includes a cushion in the form of a boot 56 of an energy-absorbing elastomeric material such as a moldable plastic resin, for example a polyurethane material having a durometer hardness in the range of 60–80 on the A scale. One material which has been found satisfactory is a moldable polyurethane plastic resin material available from Evergreen Plastics, Inc., of Beaverton, Oreg., designated as EA2789, and which has a durometer hardness of 70±5 on the A scale.

The base 40 may be of any suitably strong and rigid material that is not unnecessarily heavy, including wood or various reinforced materials. A preferred construction, however, is a hollow base of coaxial rotationally molded plastic such as a polyethylene, with a wall thickness of about one quarter inch.

The control panel 28 is attached to the base 40 where it is available to the pilot of the aircraft from either side, so that it is immaterial whether the pilot is in the left seat or the right. The front of the base has angled faces 58 to avoid obstructing the pilot's movement of control yokes and levers. The face 58 on the side of the base 40 that is farther from the pilot may also serve as a place to mount other displays or items related to a particular camera or other sensor.

A mast 60 extends upward from the base 40 and is adjustable with respect to the base 40 as will be explained presently, in order to place the mast 60 in a desired orientation with respect to the helicopter 12 or another type of aircraft or other moving platform in connection with which the adjustable sensor supporting apparatus 14 is to be used in accordance with the invention. The mast 60 has a lower end portion 52 which is preferably massive. The lower portion 62 may, for example, be made of a thick-walled (e.g., schedule 40) steel pipe with a diameter of about 4 inches. The lower portion 62 also includes a base plate 64, preferably a flat, circular plate of a substantial thickness, that may also be of steel, with a diameter 65 of about 11 inches and a thickness of about 0.75 inch, for example, and that is preferably welded to the lower end of the cylinder or thick-walled pipe. The upper end portion 66 of the mast may be of 2 inch×2 inch square tubing with ¼ inch wall thickness.

A flange 68 is mounted at the top of the upper end portion 66 of the mast 60, to receive the camera carrier 22 or other sensor attachment fixture desired or required for the particular type of camera or other sensor being carried on the adjustable sensor supporting apparatus 14.

Attached to the lower side of the base plate 64 is a cushioning body 70 of somewhat soft and resilient elastomeric material, and whose general shape is that of a minor segment of a sphere. The cushioning body 70 has a maximum thickness 71 of about 3 inches, in one embodiment of the invention, and has a minimum thickness, as at 75, of at least ½ inch and preferably about an inch. A central axis 72 of the mast 60 extends perpendicular to the center of the base plate 64, and the cushioning body 70 is centered on and attached to the base plate 64 by bolts 74 located in cylindrical recesses 76 in the cushioning body 70 and engaged by suitable threads in the base plate 64.

In the illustrated embodiment of the invention the cushioning body 70 defines a convex spherical outer or mating surface 78 at the bottom of the mast and aligned with the central axis 72 of the most 60, although other alignments might be desired for supporting certain devices on the upper end portion 66 of the mast 60. A margin of the cushioning body extends radially outward beyond the base plate 64 a distance of at least about ¼ inch, as shown at 73. This provides desired cushioning in radial, or lateral, directions to absorb vibrational movement in directions other than along the central axis 72.

A generally cylindrical cavity 80 is defined centrally in the cushioning body 70, interrupting the mating surface 78 and aligned with the central axis 72 of the mast 60, in one embodiment of the invention.

The mast 60 has a height 79 (including the cushioning body 70) of about 16 inches in one preferred embodiment of the invention, to support the cameras 18 and 20 or other sensors where their lenses or other receptors are located near where a passenger's eyes would be, to provide an optimum field of view. The diameter 65 is preferably at least about half the height 79, to provide ample stability.

As may be seen best in FIG. 5, the base 40 defines a bowl-like concave receptacle 86 for the cushioning body 70. The receptacle 86 defines a concave, spherical, second mating surface 88 which conforms matingly to the convex spherical mating surface 78 of the cushioning body 70. A shallow, flat-bottomed cavity 90 intersects with and extends downwardly a small distance beneath the central portion of the concave mating surface 88.

The spherical mating surfaces 78 and 88 have equal radii of curvature, so that the surfaces 78 and 88 fit closely together, yet the base 40 and the mast 60 can be positioned at any desired attitude or orientation of angle or rotation with respect to each other within the range of variation of positions likely to be desired as a result of the inclination of the seat cushion 42 of the passenger seat 16 and the preferred attitude of the helicopter 12 during flight.

Once adjusted, the relative positions of the mast 60 and base 40 are maintained, in large part, by the effects of friction between the spherical mating surfaces 78 and 88.

The preferred elastomeric material of the cushioning body 70 is not slippery, and since it is fairly soft it gradually conforms closely to the concave spherical mating surface 88, making it difficult for the mating surfaces 78 and 88 to slip relative to each other once the mast 60 has been placed in its desired position with respect to the base 40. A preferred material for the cushioning body 70 also has a damping effect, absorbing vibratory motion and converting such motion into heat, rather than directing it all to the mast 60. Preferably such a material has a durometer hardness on the A scale in the range of 60 to 80. One material which has been found to be satisfactory is the previously mentioned moldable polyurethane plastic resin material available from Evergreen Plastics, Inc., of Beaverton, Oreg. designated as EA2798, which has a durometer hardness of 70±5 on the A scale.

A number of elongate flexible tension-bearing members, for example, four straps 94, 96, 98, and 100, are each preferably equipped with a respective adjustable buckle 102, such as a side-release buckle of appropriate strength. An upper end of each strap is attached to the lower end portion 62 of the mast 60 as by a respective slotted plate bolted to the mast 60. Each of the straps extends downwardly and is connected through one part of the respective buckle 102 to a respective short anchoring strap 104 to which is attached a mating portion of the respective buckle 102. The anchoring strap 104 is preferably attached to the base of the passenger seat 16 through a suitable anchor plate 106. It will be understood that the anchor plates 106 could also be attached to other appropriate structures such as to the deck 48 of the helicopter, or to another structure available in another type of aircraft or vehicular platform used to carry the adjustable supporting apparatus 14 and associated cameras or other sensors.

Figure 7:
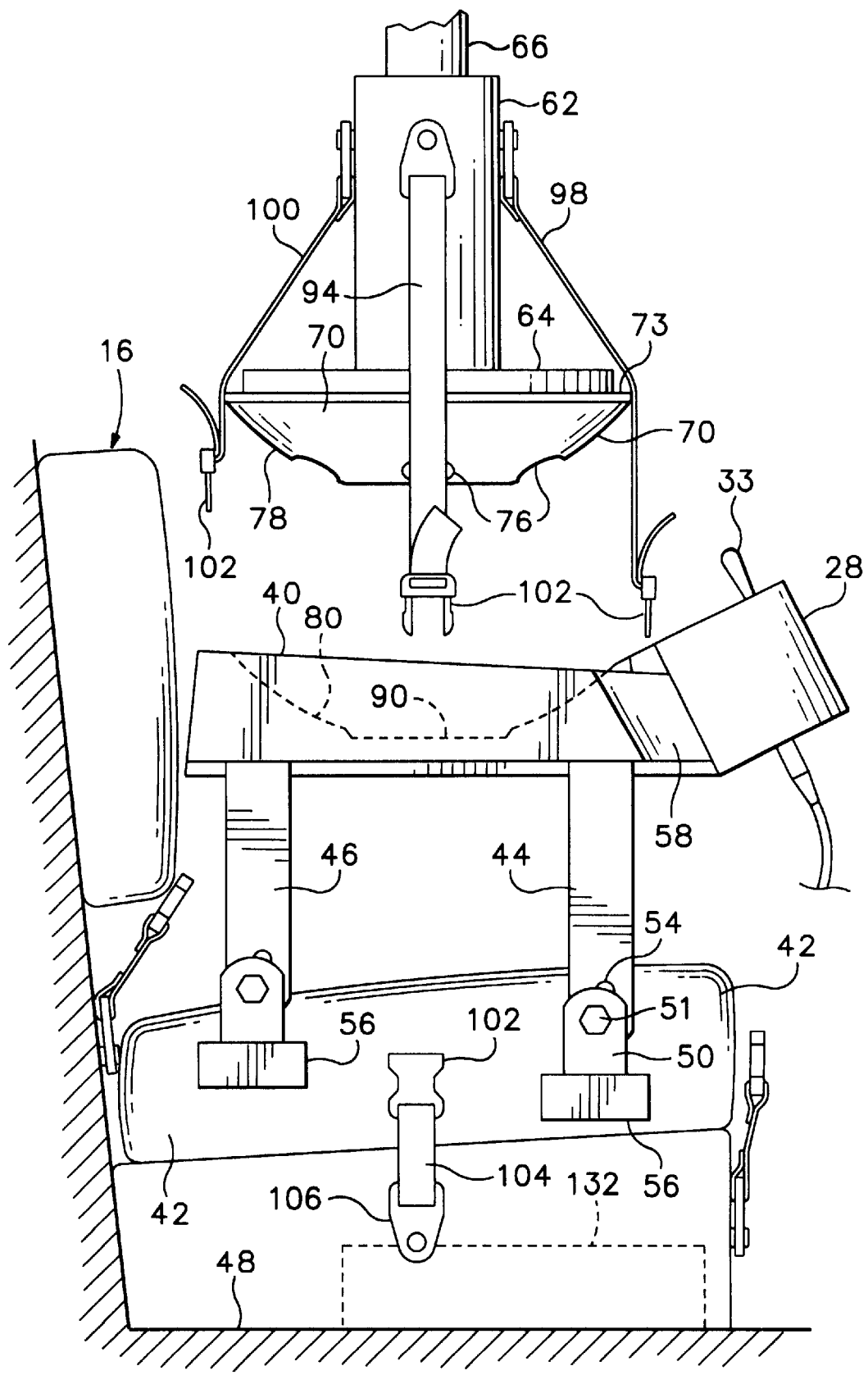
FIG. 7 is a side elevational view of a portion of the helicopter shown in FIG. 1, together with the base portion and the lower portion of the mast of the adjustable sensor supporting apparatus of the present invention, shown spaced apart from each other in order to illustrate the preferred manner of installation and adjustment of the adjustable sensor supporting apparatus of the invention

Referring also to FIG. 7, the adjustable sensor supporting apparatus 14 is best installed for use, as in the helicopter 12, by first loosening the bolt and nut combination 52 associated with each of the feet 50, to the extent required to permit the bolt 52 to move in the slot 54 of each of the legs 44 and 46. The base 40 is then placed upon the cushion 42 of the passenger seat 16, with the mast 60 supported by the base 40, so that the weight of the adjustable mounting apparatus is carried by the passenger seat 16. Once the seat has had a short time, for example 2 to 3 minutes, to settle and assume a stable, compressed condition, each of the bolt and nut combinations 52 is tightened, with the associated foot 50 resting solidly on the deck 48.

Once the feet 50 have been adjusted and fastened to the respective legs 44 and 46, the base 40 is supported stably on the passenger seat 16. The mast 60, together with any cameras or sensors already attached to the mast 60, is then raised far enough to separate the mating surfaces 78 and 88 slightly and permit the mast 60 to be rotated and tilted as desired with respect to the base 40. The cavity 80 in the bottom side of the cushioning body 70, and the cavity 90 in the bottom of the receptacle 86 in the base 40 contain enough air to prevent the cushioning body 70 from acting as a suction cup in the receptacle 86, so that when the mast 60 is raised the air contained in the cavities 80 and 90 can flow between the spherical mating surfaces 78 and 88. The cushioning body 70 can thus be lifted to free the spherical mating surfaces 78 and 88 from each other to allow the orientation of the mast 60 to be adjusted with respect to the base 40.

The mast 60 is lowered into the receptacle 86 in the base 40 when it has been adjusted to the desired orientation, bringing portions of the mating surfaces 78 and 88 into contact with each other again. The cushioning body 70 rapidly accommodates itself to the shape of the concave spherical mating surface 88, resisting relative movement between the mast 60 and the base 40. The side straps 94 and 96, the front strap 98, and the rear strap 100 are then attached to the respective short anchoring straps 104 by the buckles 102. It will be seen that an opening 101 extends between the base 40 and the control panel 28 to accommodate the forward strap 98. Each of the straps is then adjusted with respect to its respective buckle 102, so as to place each of the straps 94, 96, 98, and 100 under a small amount of tension to assist in holding the mast 60 in the required position with respect to the base 40.

Preferably, the straps 94, 96, 98, 100, and 104 are made of a strong and somewhat elastic textile material, such as Nylon webbing of adequate strength, as often is used for luggage carrying straps, weapons slings, belts, and the like. For example, Nylon webbing material readily available from various sources, having a width of one inch and a tensile strength of 300 pounds is satisfactory for the adjustable supporting apparatus 14 shown.

Tension in the straps 94, 96, 98, and 100 urges the adjustable supporting apparatus 14 and any sensors carried upon the top of the mast 60 downward toward the deck 48 so that the legs 44 and 46 and the associated feet 50 then carry a portion of the weight and of the tension forces in the straps. This keeps the adjustable mounting apparatus 14 and any sensors such as cameras carried on the mast 60 securely fixed and substantially immovable in the adjusted position with respect to the helicopter 12, so that gravity and the forces and accelerations of flight maneuvers will not significantly move the apparatus 14 and sensors carried on it.

Because a helicopter vibrates noticeably during operation it is desired to isolate the sensors such as the cameras carried on the mast 60 from the vibration. Isolation is preferably accomplished in accordance with the present invention partly by the effects of the elastomeric boots 56, which isolate the feet 50 and the legs 44 and 46 from the vibration of the deck 48. The legs 44 and 46, with their inverted "U" shape, have some resiliency and thus they also provide some freedom for the base 40 to avoid moving with the vibration of the helicopter. The cushion 42 of the passenger seat 16 generally isolates the base 40 from vibration of the helicopter 12, as the seats are designed to provide the most comfortable location and to isolate the passenger and pilot from vibration to the extent possible.

Additionally, the cushioning body 70, by virtue of its elastomeric nature, provides further isolation of the mast 60 from any vibration that is transmitted to the base 40. Finally, the elasticity of the straps 94, 96, 98, and 100 helps prevent transmission of vibration to the mast 60 while the straps hold the mast in its adjusted position with respect to the base 40.

The inertia of the relatively massive mast 60, including the base plate 64, opposes any forces of vibration attempted to be exerted through the base 40, so that those forces are to a great extent dissipated and diffused in deforming the cushioning body 70 elastically instead of moving the mast 60. A substantial amount of vibrational energy is thus absorbed in and converted to a small amount of internal heating of the cushioning body 70, rather than moving the cameras or other sensors supported by the mast 60.

When a camera used with the apparatus includes it own image stabilization devices, the apparatus of the invention provides improved image quality by damping vibration in the frequency ranges not affected by the image stabilization devices. Thus, for example, cameras that are internally stabilized, such as a Sony® VX1000, are able to perform better as a result of the reduction of vibration that results from use of the apparatus according to the present invention for support in an aircraft such as the helicopter 12.

Figure 8:
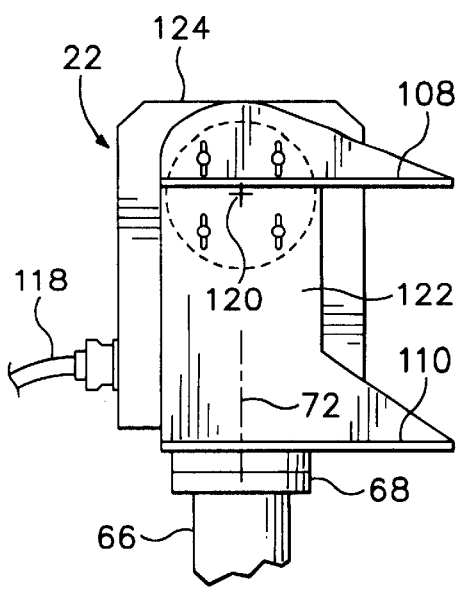
FIG. 8 is a side elevational view, at a further enlarged scale, of the motor driven, servo-controlled camera attachment fixture shown in FIGS. 1–3, carrying a video camera and a still camera, together with an upper portion of the mast.
Figure 9:
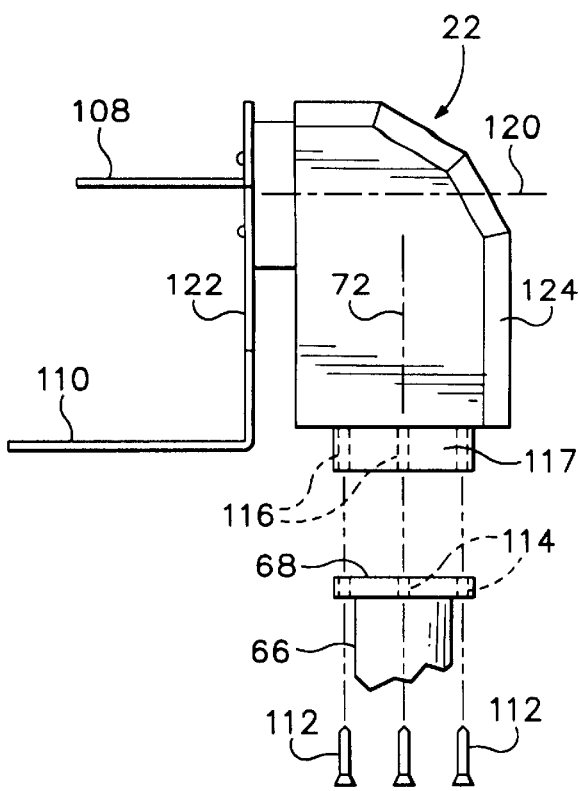
FIG. 9 is a front elevational view of the camera attachment fixture shown in FIG. 8, partially exploded to show the manner of its attachment to the top of the mast.

Referring next to FIGS. 8 and 9, it will be seen that the camera carrier 22 includes a pair of mounting plates, an upper mounting plate 108 on which the video camera 18 is mounted as shown in FIG. 2, and a lower mounting plate 110, on which a still camera 20 is mounted, also as shown in FIG. 2. The carrier 22 is attached to the flange 68 by screws 112 extending though holes 114 in the flange 68 and engaged in threaded bores 116 in the motorized camera carrier 22. Respective motors (not shown) within the servo-controlled motorized camera carrier 22 are controlled by signals carried through a control cable 118, to move a crank plate 122 to which the mounting plates 108 and 110 are connected, about the central axis 72 of the mast 60, or about an axis 120 extending at right angles to the central axis 72.

Preferably, the mast 60 will be located with respect to the base 40 so that the central axis 72 of the mast 60 is vertical when the helicopter 12 carrying the adjustable sensor supporting apparatus 14 is in straight and level flight, or when another mobile platform is in its normal orientation. When the axis 72 is vertical the axis 120 will be in a horizontal plane, so that rotation of the upper portion 124 of the camera carrier 22 with respect to its base 117 effects a panning movement, or change in azimuth direction, of a camera mounted on the camera carrier 22, and rotation about the axis 120 will elevate or depress the line of sight of the camera or other sensors carried on the device, in a vertical plane. This allows for nearly vertically downward aim of a camera or other sensor directed laterally of the helicopter 12 or other vehicle. One suitable servo-controlled, motorized camera carrier of this type is available from the Panja Company, formerly AMX, of Dallas, Tex. as its "AMX Positract-30" model, although various other similar devices would work.

Figures 6, 10:
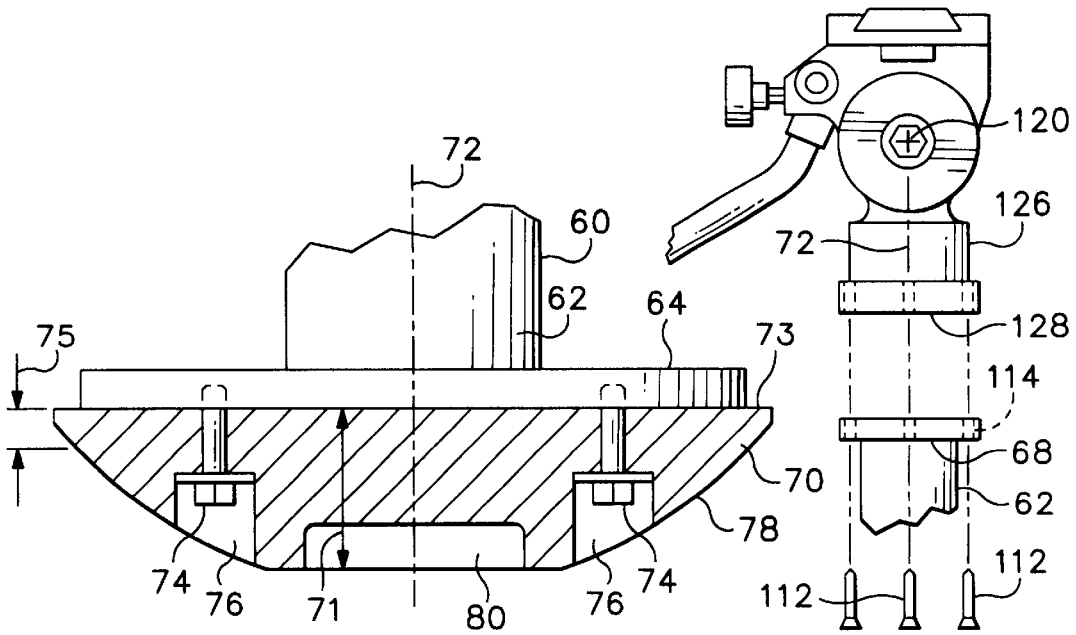
FIG. 6 is a view of the portion of the mast of the adjustable sensor supporting apparatus shown in FIGS. 4 and 5, in which the cushioning body portion of the mast is shown in section view taken along line 5—5 of FIG. 4.
FIG. 10 is a side elevational, partially exploded view of a many controllable camera attachment fixture an upper portion of the mast.

As shown in FIG. 10, it is also feasible to carry a camera or other sensor on a manually operated camera carrier 126, whose base 128 similarly is attached to the flange 68 at the top end 62 of the mast 60 to permit movement of a camera carried on the manually operated camera mount 126 about the central axis 72 of the mast 60 or a normally horizontal axis 120 perpendicular to the axis 72.

Useful stabilization of the aim or smoothing of the movement of a sensor may be provided by use of a small gyro stabilizer in association with the camera carrier 22 or 126. One satisfactory gyro-stabilized tracking device is available from Ken-Lab, Inc., of Essex, Conn. under the designation Kenyon Gyro Stabilizer, model Commander KS-6.

So that the entire apparatus may remain independent of the helicopter 12 or other moving sensor carrying platform in which it is to be used, a power supply may be provided in a portable case 132 that is located in an available space, such as beneath the passenger seat 16. The case 132 may also include a computer connected with the control panel 28 and which is part of a servo-control system for operating the camera carrier 22 and the cameras or other sensors. The power supply may include enough electric batteries to power the sensor and the servo-control system for an acceptable time, or may also be connected electrically to an electrical supply system of the helicopter 12 or other platform.

Figure 11:
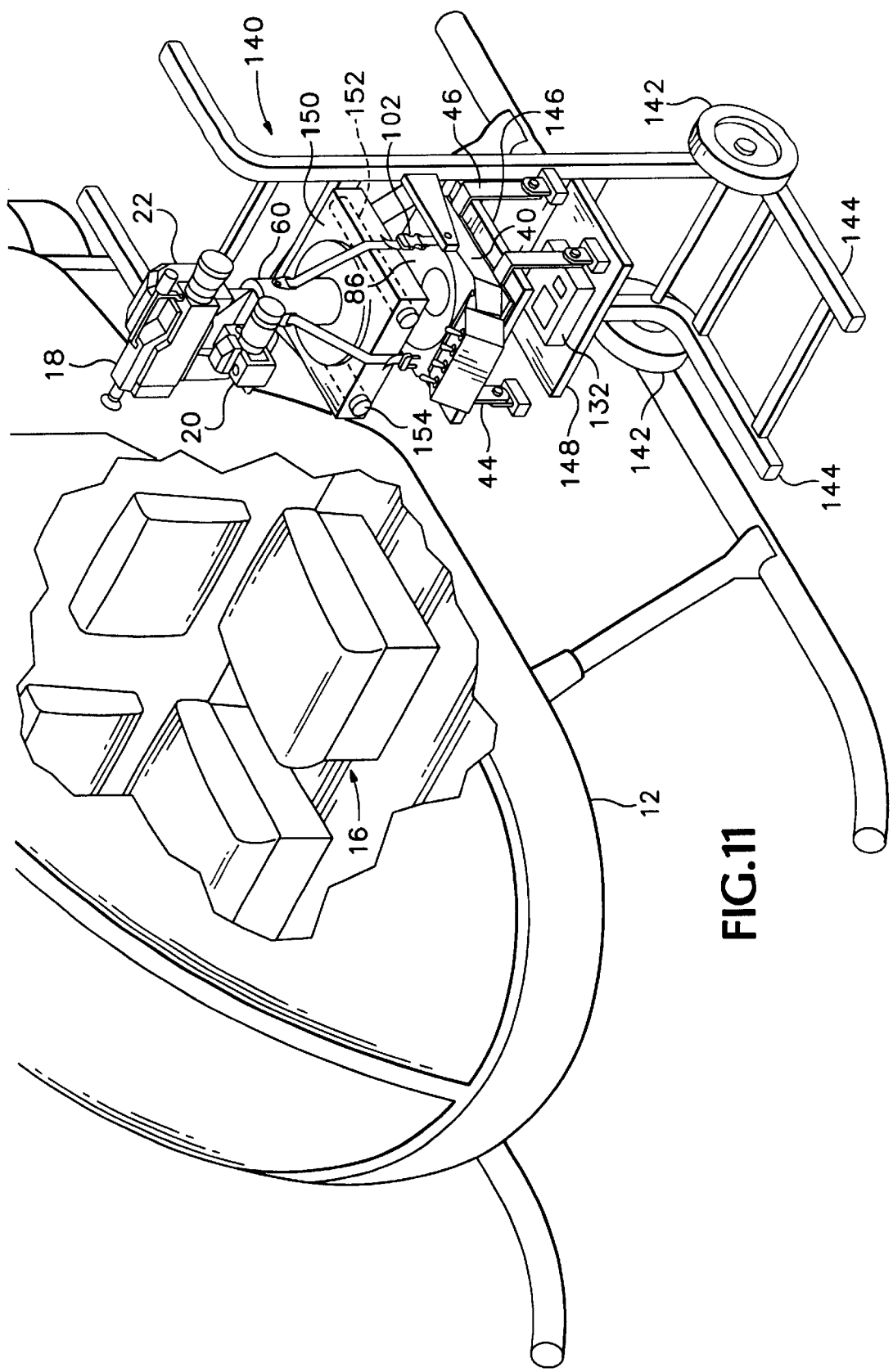
FIG. 11 is a perspective view of a portion of a helicopter and a cart used to carry the sensor supporting apparatus shown in FIGS. 1–3 during installation in or removal from an aircraft or other vehicle, and during storage of the apparatus.

As shown in FIG. 11, a cart 140 of suitably strong construction, as of welded steel tubing, has a pair of wheels 142 and feet 144 to support the cart 140 in an upright position. A shelf 146 is provided to support the base 40 with the legs 44 and 46 straddling the shelf 146. A bottom shelf or box 148 supports the power supply and computer case 132. A mast-carrying support 150 is similar in shape to the base 40 but without the control panel 28 or any legs, and includes a concave receptacle similar to receptacle 86, to receive the cushioning body 70. The mast carrier portion or support 150 may be of construction similar to the base 40, but including a pair of tubular holes 152. A pair of parallel generally horizontal arms 154 of metal that are part of the frame of the cart 140 extend through the tubular holes 152, attaching the carrier 150 integrally to the cart 140. Buckle parts may be provided on the cart 140 to mate with buckle parts 102 of the straps 94, 96, 98, and 100 to secure the mast 60 to the cart 140.

The cart 140, on the ground, preferably receives and supports the mast 60 at a convenient height, similar to its height when installed in the helicopter 12 or other aircraft with respect to which a particular cart 140 is intended to be used. As a result the mast 60 is easily moved to or from the carrier 150 without being raised or lowered much, while the sensor supporting apparatus is being installed in or removed from the helicopter 12 or other aircraft. The sensor supporting apparatus can be stored on the cart 140, and easily moved on the cart 140, to or from an aircraft with which it is used.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A passively stabilizing adjustable sensor supporting apparatus for a directional sensor, comprising:

(a) a base including a first adjustable mating part;

(b) a mast having an upper end and a lower end, said lower end including a second adjustable mating part, said second adjustable mating part fitting matingly together with said first adjustable mating part in a selected position;

(c) a cushioning body of an elastomeric material included in one of said adjustable mating parts and located in contact with the other of said adjustable mating parts, said cushioning body supporting said mast and limiting transmission of vibration from said base to said mast and preventing said mating parts from moving with respect to each other unless said first adjustable mating part is lifted from said second adjustable mating part to separate said mating parts at least slightly from each other; and (d) a sensor carrying fixture located on said upper end of said mast.

2. The adjustable sensor supporting apparatus of claim 1 wherein one of said mating parts includes a generally spherical concave surface and the other of said mating parts includes a generally spherical convex surface.

3. The adjustable sensor supporting apparatus of claim 1 wherein said elastomeric material of said cushioning body defines a mating surface of one of said mating parts that prevents movement of said one of said mating parts with respect to said other one of said mating parts.

4. The adjustable sensor supporting apparatus of claim 1 wherein said adjustable mating part of said mast includes a convex mating surface and said adjustable mating part of said base includes a concave mating surface.

5. The adjustable sensor supporting apparatus of claim 4 wherein said adjustable mating part of said mast includes said cushioning body of elastomeric material.

6. The adjustable sensor supporting apparatus of claim 4 wherein said adjustable mating part of said mast defines a cavity interrupting said convex mating surface thereof.

7. The adjustable sensor supporting apparatus of claim 1 including a pair of legs, each adjustable in length, attached to said base.

8. The adjustable sensor supporting apparatus of claim 7 wherein said legs have feet including cushioning portions of an elastomeric material.

9. The adjustable sensor supporting apparatus of claim 1 wherein said mast defines a central axis and said sensor carrying fixture includes a mounting part that is adjustably moveable with respect to said mast, through an angle about an axis parallel with said central axis.

10. The adjustable sensor supporting apparatus of claim 1 wherein said mast defines a central axis and said sensor carrying fixture includes a mounting part that is adjustably moveable with respect to said mast, through an angle about an axis extending generally perpendicular to said central axis.

11. The adjustable sensor supporting apparatus of claim 1, including a plurality of flexible elongate tension-bearing connecting members each extending diagonally downward from a respective end thereof attached to said mast and thereby helping to stabilize said mast with respect to said base.

12. The adjustable sensor supporting apparatus of claim 11 wherein at least some of said tension-bearing connecting members are straps of textile material and have adjustable effective lengths.

13. The adjustable sensor supporting apparatus of claim 1 wherein said sensor carrying fixture is manually adjustable about two angularly separate axes.

14. The adjustable sensor supporting apparatus of claim 1 wherein said mast has a relatively massive lower end portion and a relatively light upper end portion.

15. The adjustable sensor supporting apparatus of claim 1 wherein said mast has a length and said lower end includes a generally circular base plate having a diameter equal to at least about one half of said length.

16. A passively stabilizing adjustable sensor supporting apparatus for a directional sensor, comprising:
(a) a base including a first adjustable mating part;
(b) a mast having an upper end and a lower end, said lower end including a second adjustable mating part, said second adjustable mating part fitting matingly and adjustably together with said first adjustable mating part in a selected position;
(c) a cushioning body of an elastomeric material included in one of said adjustable mating parts and located in contact with the other of said adjustable mating parts and resisting transmission of vibration from said base to said mast; and
(d) a remotely controllable sensor carrying fixture located on said upper end of said mast, said sensor carrying fixture being motor-driven in azimuth and elevation angles with respect to said mast.

17. An adjustable sensor supporting apparatus for a directional sensor, comprising:
(a) a base including a first adjustable mating part and a control and display panel;
(b) a pair of legs attached to said base;
(c) a mast having an upper end and a lower end, said lower end including a second adjustable mating part, said second adjustable mating part fitting matingly and adjustably together with said first adjustable mating part in a selected position;
(d) a cushioning body of an elastomeric material included in one of said adjustable mating parts and located in contact with the other of said adjustable mating parts, and resisting transmission of vibration from said base to said mast; and
(e) a remotely controllable sensor carrying fixture located on said upper end of said mast said sensor carrying fixture being motor-driven in azimuth and elevation with respect to said mast.

18. The adjustable sensor supporting apparatus of claim 17 wherein said base includes thereon a pair of separate alternative mounting locations for said control and display panel.

19. An adjustable sensor supporting apparatus for a directional sensor, comprising:
(a) a base including a first adjustable mating part;
(b) a pair of legs attached to said base;
(c) a mast having an upper end and a lower end, said lower end including a second adjustable mating part, said second adjustable mating part fitting matingly and adjustably together with said first adjustable mating part in a selected position;
(d) a cushioning body of an elastomeric material, having a durometer hardness in the range of 60 to 80 and a thickness of at least ½ inch, included in one of said adjustable mating parts and located in contact with the other of said adjustable mating parts, and resisting transmission of vibration from said base to said mast; and
(e) a sensor carrying fixture located on said upper end of said mast.

20. In combination with a mobile platform having a passenger seat, a passively stabilizing adjustable sensor supporting apparatus for a directional sensor, comprising:
(a) a base, including a concave first mating part, resting on a cushion of said passenger seat;
(b) a mast having an upper end and a lower end, said lower end including a convex second mating part, said second mating part fitting matingly and adjustably together with said first mating part in a selected position;
(c) a cushioning body of a vibration damping elastomeric material included in said second mating part and located in contact with said first mating part and resisting transmission of vibration from said base to said mast; and
(d) a sensor carrying fixture located on said upper end of said mast.

21. The adjustable sensor supporting apparatus of claim 20 wherein one of said mating parts includes a generally spherical concave surface and the other of said mating parts includes a generally spherical convex surface.

22. The adjustable sensor supporting apparatus of claim 20 wherein said elastomeric material of said cushioning body defines a mating surface of one of said mating parts and resists movement of said one of said mating parts with respect to said other one of said mating parts.

23. The adjustable sensor supporting apparatus of claim 20 wherein said convex second mating part includes a convex mating surface and defines a cavity interrupting said convex mating surface thereof.

24. The adjustable sensor supporting apparatus of claim 20 including a pair of legs attached to said base, wherein said legs are adjusted in length to rest on a floor of said mobile platform alongside said passenger seat.

25. The adjustable sensor supporting apparatus of claim 24 wherein said legs have feet including cushioning portions of an elastomeric material.

26. The adjustable sensor supporting apparatus of claim 20 wherein said mast defines a central axis and said sensor carrying fixture includes a mounting part that is adjustably moveable with respect to said mast, through an angle about an axis parallel with said central axis.

27. The adjustable sensor supporting apparatus of claim 20 wherein said mast defines a central axis and said sensor carrying fixture includes a mounting part that is adjustably moveable with respect to said mast through an angle about an axis extending generally perpendicular to said central axis.

28. The adjustable sensor supporting apparatus of claim 20, including a plurality of flexible elongate tension-bearing connecting members each extending diagonally downward, from a respective end thereof attached to said mast to a respective opposite end attached to said mobile platform so as to hold said adjustable sensor supporting apparatus securely with said second mating part in said selected position.

29. The adjustable sensor supporting apparatus of claim 28 wherein at least some of said tension-bearing connecting members are straps of textile material and have adjustable effective lengths.

30. The adjustable sensor supporting apparatus of claim 20 wherein said sensor carrying fixture is manually adjustable about two angularly separate axes.

31. The adjustable sensor supporting apparatus of claim 20 wherein said sensor carrying fixture is remotely controllable and motor-driven in azimuth and elevation angles with respect to said mast.

32. The adjustable sensor supporting apparatus of claim 31 wherein said base includes a control and display panel.

33. The adjustable sensor supporting apparatus of claim 32 wherein said base includes thereon a pair of separate alternative mounting locations for said control and display panel.

34. The adjustable sensor supporting apparatus of claim 20 wherein said mast has a relatively massive lower end portion and a relatively light upper end portion.

35. The adjustable sensor supporting apparatus of claim 20 wherein said mast has a length and includes a generally circular base plate having a diameter equal to at least about one half of said length.

36. In combination with a moveable vehicle such as a helicopter having a passenger seat, a passively stabilizing adjustable sensor supporting apparatus for a directional sensor, comprising:
(a) a base, including a first adjustable mating part, resting on a cushion of said passenger seat;
(b) a mast having an upper end and a lower end, said lower end including a second adjustable mating part, said second adjustable mating part fitting matingly and adjustably together with said first adjustable mating part in a selected position ;
(c) a cushioning body of an elastomeric material having a durometer hardness in the range of 60 to 80 and a thickness of at least ½inch, included in one of said adjustable mating parts and located in contact with the other of said adjustable mating parts, and resisting transmission of vibration from said base to said mast; and
(d) a sensor carrying fixture located on said upper end of said mast.

37. A method for aiming a sensing device carried in an aircraft, comprising:
(a) placing a base in a seat in said aircraft;
(b) placing a mast on said base;
(c) adjusting the position of said mast with respect to said base by positioning a mating surface of a lower end of said mast in a selected position with respect to a mating surface of said base, thereby placing said mast in a predetermined orientation with respect to said aircraft so that when said aircraft is in a predetermined orientation during flight said mast is substantially vertical;
(d) fastening opposite ends of a plurality of elongate tension-bearing members to said mast and to respective parts of said aircraft lower than said base and placing said members in tension;
(e) isolating said mast from vibration of said aircraft by absorbing at least a portion of any vibratory motion of said aircraft in said seat and a further portion in a cushioning body of elastomeric material included in at least one of said base and said lower end of said mast; and
(f) carrying said sensing device on an upper end of said mast, with said sensing device oriented in a desired direction with respect to said aircraft whereby said sensing device is directed outward from within said aircraft.

38. The method of claim 37, including the further step of providing a pair of legs attached to said base and including elastomeric cushioning material carried thereon, and adjusting said legs to rest on a part of said aircraft adjacent to said seat and thereby using said legs to stabilize said base in said predetermined position.

39. The method of claim 37, including the further step of displaying an image detected by said sensor on a monitor located in view of a pilot of said aircraft and directing said sensor by varying the position and direction of movement of said aircraft.

40. The method of claim 39, including the further step of adjusting said sensing device with respect to said mast, thereby aiming said sensing device in said desired direction relative to said aircraft.

41. A method for aiming a sensing device carried in an aircraft, comprising:
(a) placing a base in a predetermined position in said aircraft;
(b) placing a mast on said base;
(c) adjusting the position of said mast with respect to said base by positioning a mating surface of a lower end of said mast in a selected position with respect to a mating surface of said base, thereby placing said mast in a predetermined orientation with respect to said aircraft so that when said aircraft is in a predetermined orientation during flight said mast is substantially vertical;
(d) fastening opposite ends of a plurality of elongate tension-bearing members to said mast and to respective parts of said aircraft lower than said base and placing said members in tension;
(e) isolating said mast from vibration of said aircraft by absorbing vibratory motion of said aircraft in a cushioning body of elastomeric material included in one of said base and said lower end of said mast; and
(f) carrying said sensing device on an upper end of said mast, with said sensing device oriented in a desired direction with respect to said aircraft whereby said sensing device is directed outward from within said aircraft.

42. An adjustable, passively stabilizing, vibration isolating, sensor supporting apparatus for supporting a directional sensor, comprising:

(a) a base including an upwardly facing first mating surface;

(b) a mast having an upper end portion of relatively light weight and having a relatively massive lower end portion, said lower end portion defining a downwardly facing second mating surface;

(c) a cushioning body of an elastomeric material included either in said base or in said lower end portion of said mast, said elastomeric material defining one of said first and second mating surfaces and being in mated contact with the other one of said mating surfaces, said mast being held in a selected angular orientation with respect to said base primarily by frictional engagement between said first and second mating surfaces, and said mast thereby being supported on said base and isolated from vibration of said base by said elastomeric material; and (d) a sensor carrying fixture located on said upper end portion of said mast.

43. A method for aiming a sensing device carried in a mobile platform, comprising:

(a) placing a base in a predetermined position on a cushioned seat in said mobile platform;

(b) placing a mast on said base;

(c) adjusting the position of said mast with respect to said base by positioning a mating surface of a lower end of said mast in a selected position with respect to a mating surface of said base, thereby placing said mast in a predetermined orientation with respect to said mobile platform, so that when said mobile platform is in a predetermined normal orientation during operation thereof said mast is substantially vertical;

(d) isolating said mast from vibration of said mobile platform by absorbing and damping at least a portion of any vibration of said mobile platform in said cushioned seat and absorbing and damping a further portion thereof in a cushioning body of elastomeric material included in one of said base and said lower end of said mast; and (e) carrying said sensing device on an upper end of said mast, with said sensing device oriented in a desired direction with respect to said mobile platform.

44. The method of claim 43 including the further steps of fastening opposite ends of a plurality of elongate tension-bearing members to said mast and to respective parts of said mobile platform lower than said base and placing said members in tension.

* * * * *